United States Patent
Nimiya et al.

(10) Patent No.: US 10,311,418 B2
(45) Date of Patent: Jun. 4, 2019

(54) CHECK-OUT SYSTEM, INCLUDING MERCHANDISE REGISTRATION APPARATUS AND PAYMENT APPARATUS, AND ELECTRONIC RECEIPT MANAGEMENT SERVER

(71) Applicant: TOSHIBA TEC KABUSHIKI KAISHA, Tokyo (JP)

(72) Inventors: Shigeki Nimiya, Yokohama Kanagawa (JP); Hiroyuki Aikawa, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 269 days.

(21) Appl. No.: 15/253,310

(22) Filed: Aug. 31, 2016

(65) Prior Publication Data

US 2017/0091738 A1 Mar. 30, 2017

(30) Foreign Application Priority Data

Sep. 28, 2015 (JP) .................................. 2015-189768

(51) Int. Cl.
*G06Q 20/18* (2012.01)
*G06Q 20/10* (2012.01)
(Continued)

(52) U.S. Cl.
CPC ......... *G06Q 20/18* (2013.01); *G06Q 20/0453* (2013.01); *G06Q 20/102* (2013.01); *G06Q 20/202* (2013.01); *G06Q 20/204* (2013.01); *G06Q 20/208* (2013.01); *G06Q 20/209* (2013.01); *G06Q 20/405* (2013.01)

(58) Field of Classification Search
CPC ..... G06Q 20/18; G06Q 20/102; G06Q 20/209
See application file for complete search history.

(56) References Cited

U.S. PATENT DOCUMENTS

| 5,013,896 A | * | 5/1991 | Ono | ........................ | A47F 9/048 |
| | | | | | 235/375 |
| 7,383,200 B1 | * | 6/2008 | Walker | ............. | G06Q 10/06311 |
| | | | | | 705/7.15 |

(Continued)

FOREIGN PATENT DOCUMENTS

JP 2013-242839 12/2013

*Primary Examiner* — Ramsey Refai
(74) *Attorney, Agent, or Firm* — Kim & Stewart LLP

(57) ABSTRACT

A check-out system includes a registration apparatus and a plurality of payment apparatuses. The registration apparatus receives input of merchandise information and receives input of a user code in connection. The registration apparatus generates payment identification based on the input merchandise information. The registration apparatus transmits the payment information. If the user code is input in the registration apparatus, the payment information is transmitted in correspondence with the user code. One of the payment apparatuses receives input of the user code. In response to the user code being input, the payment apparatus transmits a request for the payment information that was transmitted in correspondence with the user code. The payment apparatus receives the payment information that was transmitted in correspondence with the user code. The payment apparatus processes payment with respect to the received payment information.

14 Claims, 12 Drawing Sheets

(51) Int. Cl.
*G06Q 20/20* (2012.01)
*G06Q 20/04* (2012.01)
*G06Q 20/40* (2012.01)

(56) References Cited

U.S. PATENT DOCUMENTS

| | | | |
|---|---|---|---|
| 8,868,719 B1* | 10/2014 | Satish | G06F 21/42 |
| | | | 705/35 |
| 9,105,058 B2 | 8/2015 | Suzuki | |
| 2002/0035512 A1* | 3/2002 | Pavlik | G06Q 30/06 |
| | | | 705/26.41 |
| 2004/0111360 A1* | 6/2004 | Albanese | G06Q 30/02 |
| | | | 705/38 |
| 2004/0204998 A1* | 10/2004 | Shah | G06Q 20/20 |
| | | | 705/16 |
| 2012/0209749 A1* | 8/2012 | Hammad | G06Q 30/06 |
| | | | 705/27.1 |
| 2013/0151358 A1* | 6/2013 | Ramalingam | G07G 1/12 |
| | | | 705/16 |
| 2013/0198018 A1* | 8/2013 | Baig | G06Q 20/20 |
| | | | 705/16 |
| 2015/0025986 A1* | 1/2015 | Patel | G06Q 30/0207 |
| | | | 705/16 |
| 2015/0088307 A1* | 3/2015 | Ackerman | G06Q 10/087 |
| | | | 700/241 |

* cited by examiner

FIG. 5

| | MERCHANDISE NAME | NUMBER | UNIT PRICE | AMOUNT OF MONEY | |
|---|---|---|---|---|---|
| 1 | MERCHANDISE A | 1 | 121 | 121 | IN |
| 2 | MERCHANDISE B | 1 | 298 | 298 | IN |
| 3 | MERCHANDISE C | 1 | 498 | 498 | IN |
| | | | | | |
| | | | | | |
| | | | | | |
| | | | | | |
| | | | | | |

MERCHANDISE D

| IN ONE PIECE | 81 YEN | TOTAL | 4 PIECES 998 YEN |
|---|---|---|---|

| | MERCHANDISE NAME | NUMBER | UNIT PRICE | AMOUNT OF MONEY | |
|---|---|---|---|---|---|
| 1 | MERCHANDISE A | 1 | 121 | 121 | IN |
| 2 | MERCHANDISE B | 1 | 298 | 298 | IN |
| 3 | MERCHANDISE C | 1 | 498 | 498 | IN |

MERCHANDISE D — ELECTRONIC RECEIPT

IN ONE PIECE — 81 YEN — TOTAL — 4 PIECES 998 YEN

CHECK-OUT SYSTEM, INCLUDING MERCHANDISE REGISTRATION APPARATUS AND PAYMENT APPARATUS, AND ELECTRONIC RECEIPT MANAGEMENT SERVER

CROSS-REFERENCE TO RELATED APPLICATION

This application is based upon and claims the benefit of priority from Japanese Patent Application No. 2015-189768, filed Sep. 28, 2015, the entire contents of which are incorporated herein by reference.

FIELD

Embodiments described herein relate generally to a check-out system, a merchandise registration apparatus, a payment apparatus, and an electronic receipt management apparatus.

BACKGROUND

A semi-self-service type check-out system is known. In the conventional check-out system of this type, purchase registration and payment are respectively performed in a merchandise registration apparatus and a payment apparatus, in a supermarket or the like. Generally, a salesperson operates the merchandise registration apparatus, and a shopper operates the payment apparatus.

Such a system is adapted to transfer payment information for payment process from the merchandise registration apparatus to a single payment apparatus of a plurality of payment apparatuses. However, if a single payment apparatus has payment information for a plurality of transactions, this may confuse the shopper who attempts payment.

Thus, the salesperson that operates the merchandise registration apparatus selects a single unoccupied payment apparatus among the plurality of payment apparatuses, and operates the merchandise registration apparatus so as also to transmit the payment information to the selected payment apparatus.

Therefore, whenever the registration of the merchandise for one transaction is completed, the salesperson needs to select and designate a single payment apparatus as a transfer destination in the merchandise registration apparatus, and this is a burden on the salesperson.

In view of this, it is desired to reduce the burden on the salesperson that operates the merchandise registration apparatus.

DESCRIPTION OF THE DRAWINGS

FIG. 5 illustrates an example registration screen before acquisition of a user code.

FIG. 6 illustrates an example registration screen after the acquisition of the user code.

DETAILED DESCRIPTION

Described herein is a check-out system, a merchandise registration apparatus, a payment apparatus, and an electronic receipt management apparatus, capable of reducing the burden on the salesperson who operates a merchandise registration apparatus.

A check-out system according to an embodiment includes at least one registration apparatus and a plurality of payment apparatuses. The registration device includes a first communication unit, a first input unit, and a controller. The first input unit receives input of merchandise information for purchase in a transaction and receives input of a user code in connection with the transaction. The first controller generates payment identification based on the input merchandise information. The first controller controls the first communication unit to transmit the payment information. If the user code is input in the first input device, the payment information is transmitted in correspondence with the user code. One of the payment apparatuses receives input of the user code. In response to the user code being input, the payment apparatus transmits a request for the payment information that was transmitted in correspondence with the user code. The payment apparatus receives the payment information that was transmitted in correspondence with the user code. The payment apparatus processes payment with respect to the received payment information.

Hereinafter, an example of an embodiment will be described with reference to the drawings.

Figure 1:
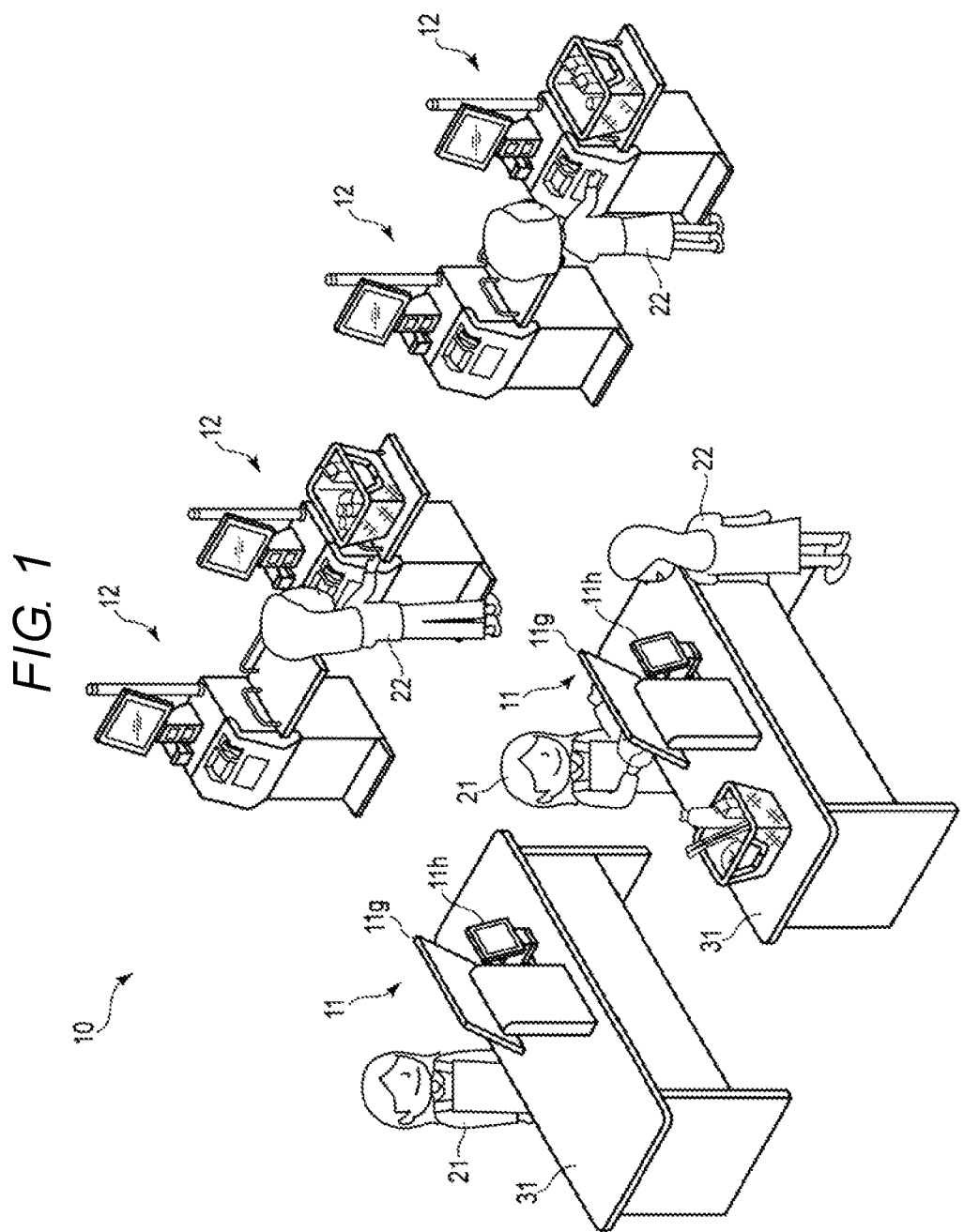
FIG. 1 is a perspective view of a check-out system according to an embodiment.

FIG. 1 is a perspective view of a check-out system 10 according to an embodiment.

The check-out system 10 includes one or more merchandise registration apparatus 11, and one or more payment apparatus 12. FIG. 1 illustrates the check-out system 10 including two merchandise registration apparatuses 11 and four payment apparatuses 12. The number of merchandise registration apparatuses 11 and payment apparatuses 12 which are included in the check-out system 10 is arbitrary, and the ratio between the number of merchandise registration apparatuses 11 and the number payment apparatuses 12 is also arbitrary. The merchandise registration apparatus 11 and the payment apparatus 12 are provided in a check-out area of a store such as a supermarket.

The operator of the merchandise registration apparatus 11 is a salesperson 21 of the store, who works as a checker. The operator of the payment apparatus 12 is a shopper 22 who purchases merchandise which is sold at the store.

Incidentally, the shopper 22 may perform some operation of the merchandise registration apparatus 11. In addition, the salesperson may operate the payment apparatus 12 in some cases.

The merchandise registration apparatus 11 is attached to a work table 31 in FIG. 1. The work table 31 has a rectangular top surface. A plurality of work tables 31 are arranged so as to be substantially parallel in the longitudinal directions of the top surfaces form passages for shoppers 22.

The merchandise registration apparatus 11 has respective functions of purchase registration, payment information generation, and transmitting the payment information to the payment apparatus 12. The purchase registration is a process of registering the merchandise that the shopper 22 brings to the registration apparatus 11, as purchase merchandise. The payment is a process of paying for the purchase merchandise. The payment information is information required in the payment process.

The payment apparatus 12 performs the payment process based on the payment information transmitted from the merchandise registration apparatus 11.

Figure 2:
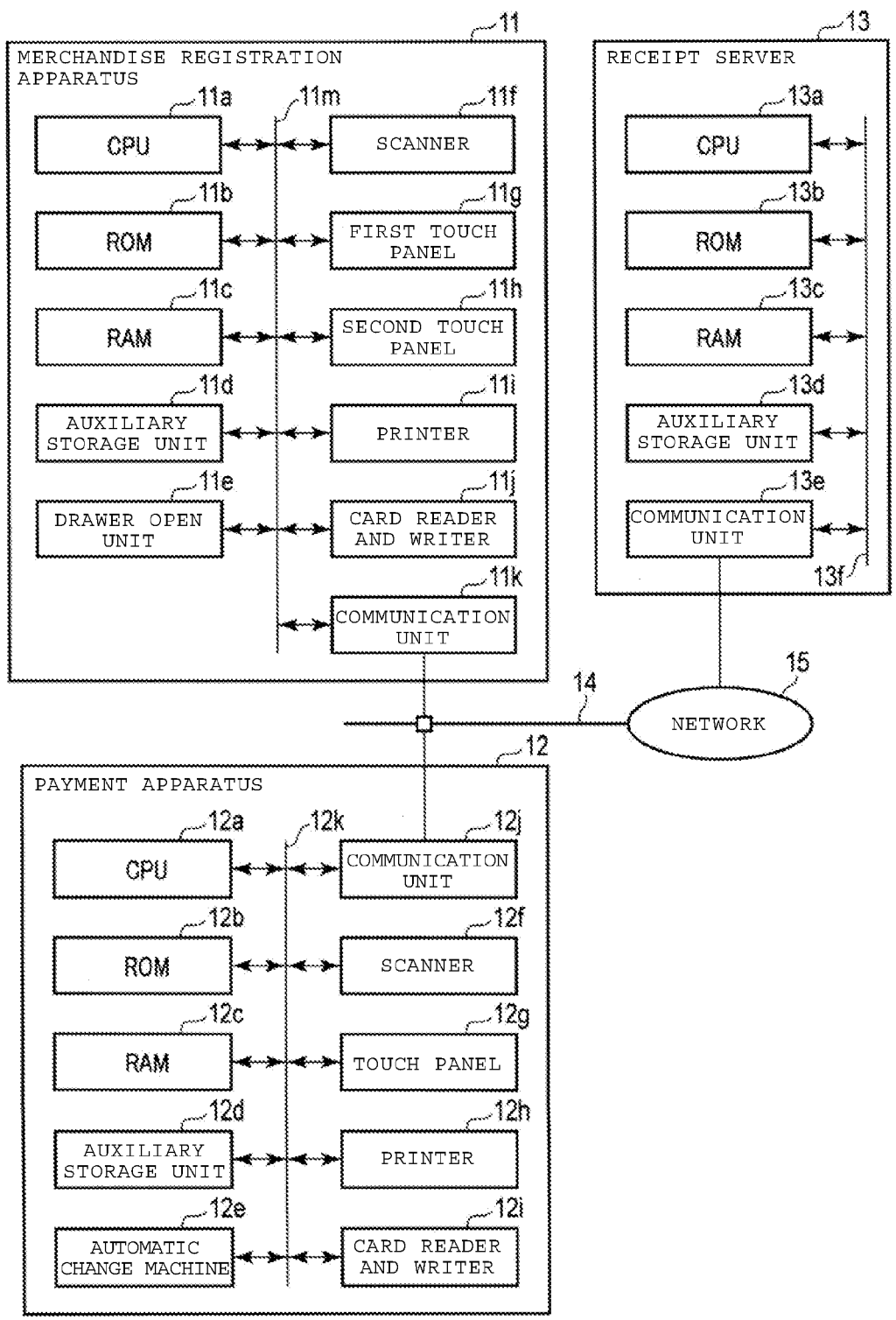
FIG. 2 is a block diagram illustrating the main circuit configurations of the check-out system.

FIG. 2 is a block diagram illustrating the main circuit configuration of the check-out system 10.

The check-out system 10 includes a receipt server 13, in addition to the merchandise registration apparatus 11 and the payment apparatus 12. The receipt server 13 performs various processes for providing an electronic receipt service. The processes performed by the receipt server 13 include collecting the electronic receipt data from the payment apparatus 12, managing the collected electronic receipt data in association with a user code, and providing the electronic receipt data for display on a display terminal. Accordingly, the receipt server has a function as an electronic receipt management apparatus.

Both the merchandise registration apparatus 11 and the payment apparatus 12 are connected to a network such as a local area network (LAN) 14. Other types of communication networks such as the Internet can be used instead of the LAN 14. Alternatively, the merchandise registration apparatus 11 and the payment apparatus 12 may be configured to exchange information through the server. The receipt server 13 is connected to a network 15. The network 15 is typically the Internet. The network 15 may be other types of communication network such as a dedicated line network. The network 15 is also connected to the LAN 14. Thus, the receipt server 13 is capable of communicating with the merchandise registration apparatus 11 and the payment apparatus 12, through the LAN 14 and the network 15.

The merchandise registration apparatus 11 includes a central processing unit (CPU) 11$a$, a read only memory (ROM) 11$b$, a random access memory (RAM) 11$c$, an auxiliary storage unit 11$d$, a drawer open unit 11$e$, a scanner 11$f$, a first touch panel 11$g$, a second touch panel 11$h$, a printer 11$i$, a card reader and writer 11$j$, a communication unit 11$k$, and a transmission system 11$m$.

The CPU 11$a$, the ROM 11$b$, the RAM 11$c$ and the auxiliary storage unit 11$d$ are connected by the transmission system 11$m$ and may be provided as a computer.

The CPU 11$a$ corresponds to the central processor of the computer. The CPU 11$a$ controls respective units in order to realize various functions as the merchandise registration apparatus 11, based on the operating system, the middleware, and the application programs, which are stored in the ROM 11$b$ and the RAM 11$c$. The CPU 11$a$ thus operates as a controller for the units of the merchandise registration apparatus 11.

The ROM 11$b$ corresponds to the main memory of the computer. The ROM 11$b$ stores the operating system. The ROM 11$b$ may store the middleware and application programs in some cases. Further, the ROM 11$b$ may also store data that is referred to when the CPU 11$a$ performs various processes.

The RAM 11$c$ corresponds to the main working memory of the computer. The RAM 11$c$ stores data that is referred to when the CPU 11$a$ performs various processes. Further, the RAM 11$c$ is utilized as a so-called work area for storing data that is temporarily used when the CPU 11$a$ performs various processes.

The auxiliary storage unit 11$d$ corresponds to the auxiliary storage of the computer. The auxiliary storage unit 11$d$ stores data that is used when the CPU 11$a$ performs various processes or data that is generated through the process performed by the CPU 11$a$. As the auxiliary storage unit 11$d$, for example, an electric erasable programmable read only memory (EEPROM), a hard disk drive (HDD), a solid state drive (SSD), or the like can be used.

The application program stored in the ROM 11$b$ or the auxiliary storage unit 11$d$ includes a control program describing a control process to be described later. The installation of the merchandise registration apparatus 11 is generally performed in the state where the control program is stored in the ROM 11$b$ or the auxiliary storage unit 11$d$. However, the merchandise registration apparatus 11 may be installed in the state where the control program is not stored in the ROM 11$b$ or the auxiliary storage unit 11$d$, and the control program may be transferred by being recorded in a removable recording medium or through a network. In this case, for example, the control program is written into the auxiliary storage unit 11$d$ of the merchandise registration apparatus 11 in response to the operation of the user. As the removable recording medium, a magnetic disk, a magneto-optical disk, an optical disk, a semiconductor memory, or the like can be used.

The drawer open unit 11$e$ automatically opens a drawer that accommodates money.

The scanner 11$f$ reads the information about the merchandise, and obtains the merchandise code of the merchandise. As the scanner 11$f$, various types of scanners can be used. The scanner 11$f$ may be a single type of scanner or may include a plurality of types. The scanner 11$f$ may be a two-dimensional code scanner of a fixed type or a hand-held type. The scanner 11$f$ may be a scanner of a type that identifies merchandise from the image of merchandise by using an image recognition technique.

Each of the first and second touch panels 11$g$ and 11$h$ includes a display device and a touch sensor. The display device displays a screen such as a graphical user interface (GUI) screen. As the display device, for example, a known device such as a color LCD can be used. The touch sensor is positioned to overlap the display surface of the display device. The touch sensor detects the operator's touch position on the display surface of the display device, and sends the position information to the CPU 11$a$. As the touch sensor, a known device can be used. As illustrated in FIG. 1, the operation surface of the first touch panel 11$g$ is oriented towards a location where the salesperson 21 operating the merchandise registration apparatus 11 should be positioned. As illustrated in FIG. 1, the operation surface of the second touch panel 11$h$ is oriented towards a location where the shopper who purchases the merchandise to be registered in the merchandise registration apparatus 11 should be positioned. Thus, the second touch panel 11$h$ is an example of the operation device.

The printer 11$i$ is, for example, a thermal printer, a dot impact printer, or the like, and issues a receipt by printing various types of strings and images on a receipt sheet.

The card reader and writer 11$j$ reads data recorded on the card, and writes data to the card. The card may include various types of cards having information about a payment process recorded thereon, such as a membership card and a point card, in addition to payment cards such as a credit card, a debit card, an electronic money card, and a prepaid card.

The card reader and writer 11*j* may be any one of devices of magnetic, contact, and contact less types, and may include a plurality of types of devices.

The communication unit ilk performs communication through the LAN 14.

The transmission system 11*m* transmits data exchanged between the CPU 11*a*, the ROM 11*b*, the RAM 11*c*, the auxiliary storage unit 11*d*, the drawer open unit 11*e*, the scanner 11*f*, the first touch panel 11*g*, the printer 11*i*, the card reader and writer 11*j*, and the communication unit ilk. As the transmission system 11*m*, a system including various buses such as a system bus and various interface circuits connecting the buses and respective units can be used.

As hardware of the merchandise registration apparatus 11, for example, an existing POS terminal can be used.

The payment apparatus 12 includes a CPU 12*a*, a ROM 12*b*, a RAM 12*c*, an auxiliary storage unit 12*d*, an automatic change machine 12*e*, a scanner 12*f*, a touch panel 12*g*, a printer 12*h*, a card reader and writer 12*i*, a communication unit 12*j*, and a transmission system 12*k*.

The CPU 12*a*, the ROM 12*b*, the RAM 12*c* and the auxiliary storage unit 12*d* are connected by the transmission system 12*k* and may be provided as a computer.

The CPU 12*a* corresponds to the central processor of the computer. The CPU 12*a* controls respective units in order to realize various operations as the payment apparatus 12, based on the operating system, the middleware, and the application programs, which are stored in the ROM 12*b* and the RAM 12*c*. Thus, the CPU 12*a* functions as a controller for the units of the payment apparatus 12.

The ROM 12*b* corresponds to the main memory of the computer. The ROM 12*b* stores the operating system. The ROM 12*b* may store the middleware and application programs in some cases. Further, the ROM 12*b* may also store data that is referred to when the CPU 12*a* performs various processes.

The RAM 12*c* corresponds to the main working memory of the computer. The RAM 12*c* stores data that is referred to when the CPU 12*a* performs various processes. Further, the RAM 12*c* is utilized as a so-called work area for storing data that is temporarily used when the CPU 12*a* performs various processes.

The auxiliary storage unit 12*d* corresponds to the auxiliary memory of the computer. The auxiliary storage unit 12*d* stores data used when the CPU 12*a* performs various processes or data generated in the process performed by the CPU 12*a*. As the auxiliary storage unit 12*d*, for example, an EEPROM, an HDD, an SSD, or the like can be used.

The application program stored in the ROM 12*b* or the auxiliary storage unit 12*d* includes a control program describing a control process to be described later. The installation of the payment apparatus 12 is generally performed in the state where the control program is stored in the ROM 12*b* or the auxiliary storage unit 12*d*. However, the payment apparatus 12 may be installed in the state where the control program is not stored in the ROM 12*b* or the auxiliary storage unit 12*d*, and the control program may be transferred by being recorded in a removable recording medium or through a network. In this case, for example, the control program is written into the auxiliary storage unit 12*d* of the payment apparatus 12 in response to the operation of the user. As the removable recording medium, a magnetic disk, a magneto-optical disk, an optical disk, a semiconductor memory, or the like can be used.

The automatic change machine 12*e* collects coins and bills that are input. Further, the automatic change machine 12*e* discharges the coins and bills as change.

The scanner 12*f* reads the information about the merchandise, and obtains the merchandise code of the merchandise. As the scanner 12*f*, various types can be used. The scanner 12*f* may be a single type of scanner or may include a plurality of types. The scanner 12*f* may be a two-dimensional code scanner of a fixed type or a hand-held type. The scanner 12*f* may include scanners of a type that identifies the merchandise from the image of merchandise, by using an image recognition technique.

The touch panel 12*g* includes a display device and a touch sensor. The display device displays a screen such as a GUI screen. As the display device, for example, a device such as a color LCD can be used. The touch sensor is positioned to overlap the display surface of the display device. The touch sensor detects the operator's touch position on the display surface of the display device, and sends the position information to the CPU 12*a*.

The printer 12*h* issues a receipt by printing various types of strings and images on the receipt sheet, by using, for example, a thermal printer, a dot impact printer, or the like. In addition, the receipt sheet refers to a sheet-like medium for printing, and the material thereof is not limited to paper.

The card reader and writer 12*i* reads data recorded on the card, and writes data to the card. The card may include various types of cards having information about a payment process recorded thereon, such as a membership card and a point card, in addition to payment cards such as a credit card, a debit card, an electronic money card, and a prepaid card. The card reader and writer 12*i* may be anyone of devices of magnetic, contact, and contactless types, and may include a plurality of types of devices.

The communication unit 12*j* performs communication through the LAN 14. The communication unit 12*j* can also perform communication with the receipt server 13 through the network 15 connected to the LAN 14.

The transmission system 12*k* transmits data between the CPU 12*a*, the ROM 12*b*, the RAM 12*c*, the auxiliary storage unit 12*d*, the automatic change machine 12*e*, the scanner 12*f*, the touch panel 12*g*, the printer 12*h*, the card reader and writer 12*i*, and the communication unit 12*j*. As the transmission system 12*k*, a system including various buses such as a system bus and various interface circuits connecting the buses and respective units can be used.

As hardware of the payment apparatus 12, for example, a self-POS terminal can be used.

The receipt server 13 includes a CPU 13*a*, a ROM 13*b*, a RAM 13*c*, an auxiliary storage unit 13*d*, a communication unit 13*e*, and a transmission system 13*f*.

The CPU 13*a*, the ROM 13*b*, the RAM 13*c* and the auxiliary storage unit 13*d* are connected by the transmission system 13*f* and may be provided as a computer.

The CPU 13*a* corresponds to the central processor of the computer. The CPU 13*a* controls respective units so as to implement various functions as the receipt server 13, based on the operating system, the middleware, and the application programs, which are stored in the ROM 13*b* and the RAM 13*c*.

The ROM 13*b* corresponds to the main memory of the computer. The ROM 13*b* stores the operating system. The ROM 13*b* may store the middleware and application programs in some cases. Further, the ROM 13*b* may also store data that is referred to when the CPU 13*a* performs various processes.

The RAM 13*c* corresponds to the main working memory of the computer. The RAM 13*c* stores data that is referred to when the CPU 13*a* performs various processes. Further, the RAM 13c is utilized as a so-called work area for storing data that is temporarily used when the CPU 13a performs various processes.

The auxiliary storage unit 13d corresponds to the auxiliary storage of the computer. The auxiliary storage unit 13d stores data that is used when the CPU 13a performs various processes, or data that is generated through the process performed by the CPU 13a. As the auxiliary storage unit 13d, for example, an EEPROM, an HDD, an SSD, or the like can be used.

The application program stored in the ROM 13b or the auxiliary storage unit 13d includes a control program describing a control process to be described later. The installation of the receipt server 13 is generally performed in the state where the control program is stored in the ROM 13b or the auxiliary storage unit 13d. However, the receipt server 13 may be installed in the state where the control program is not stored in the ROM 13b or the auxiliary storage unit 13d, and the control program may be transferred by being recorded in a removable recording medium or through a network. In this case, for example, the control program is written into the auxiliary storage unit 13d of the receipt server 13 in response to the operation of the user. As the removable recording medium, a magnetic disk, a magneto-optical disk, an optical disk, a semiconductor memory, or the like can be used.

The communication unit 13e performs communication through the network 15. The communication unit 13e can communicate with the merchandise registration apparatus 11 and the payment apparatus 12, through the LAN 14 and the network 15.

The transmission system 13f transmits data between the CPU 13a, the ROM 13b, the RAM 13c, the auxiliary storage unit 13d, and the communication unit 13e. As the transmission system 13f, a system including various buses such as a system bus and various interface circuits connecting the buses and respective units can be used.

Next, the operation of the check-out system 10 configured as described above will be described. Incidentally, the contents of the processes to be described below are an example, and various processes capable of achieving the same results can be appropriately utilized.

If the merchandise registration apparatus 11 is activated in a merchandise registration mode, the CPU 11a starts a control process according to the control program stored in the ROM 11b or the auxiliary storage unit 11d.

Figure 3:
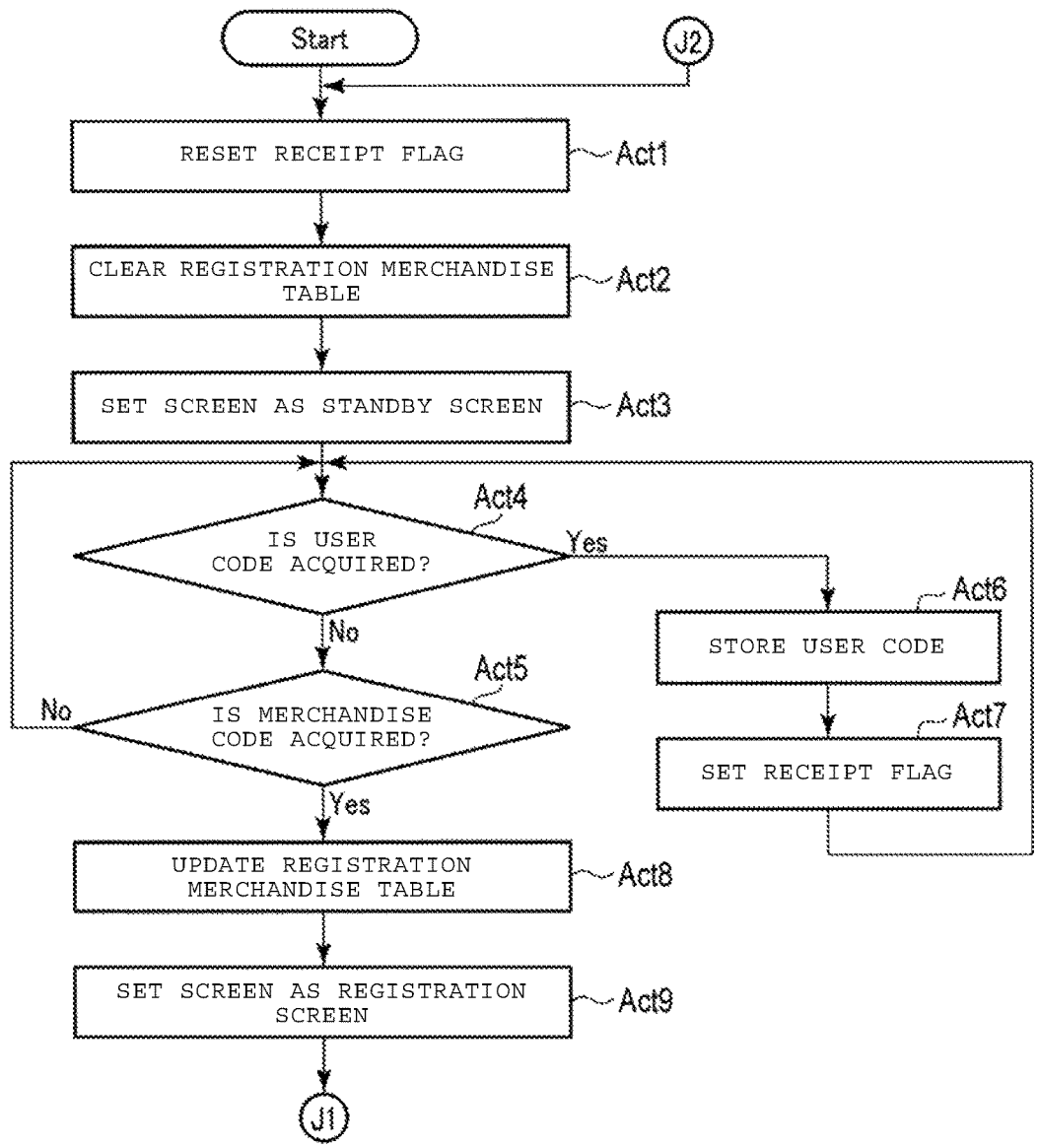
FIGS. 3 and 4 are flow charts of an example sequence of operations of a control process of a CPU included in a merchandise registration apparatus.
Figure 4:
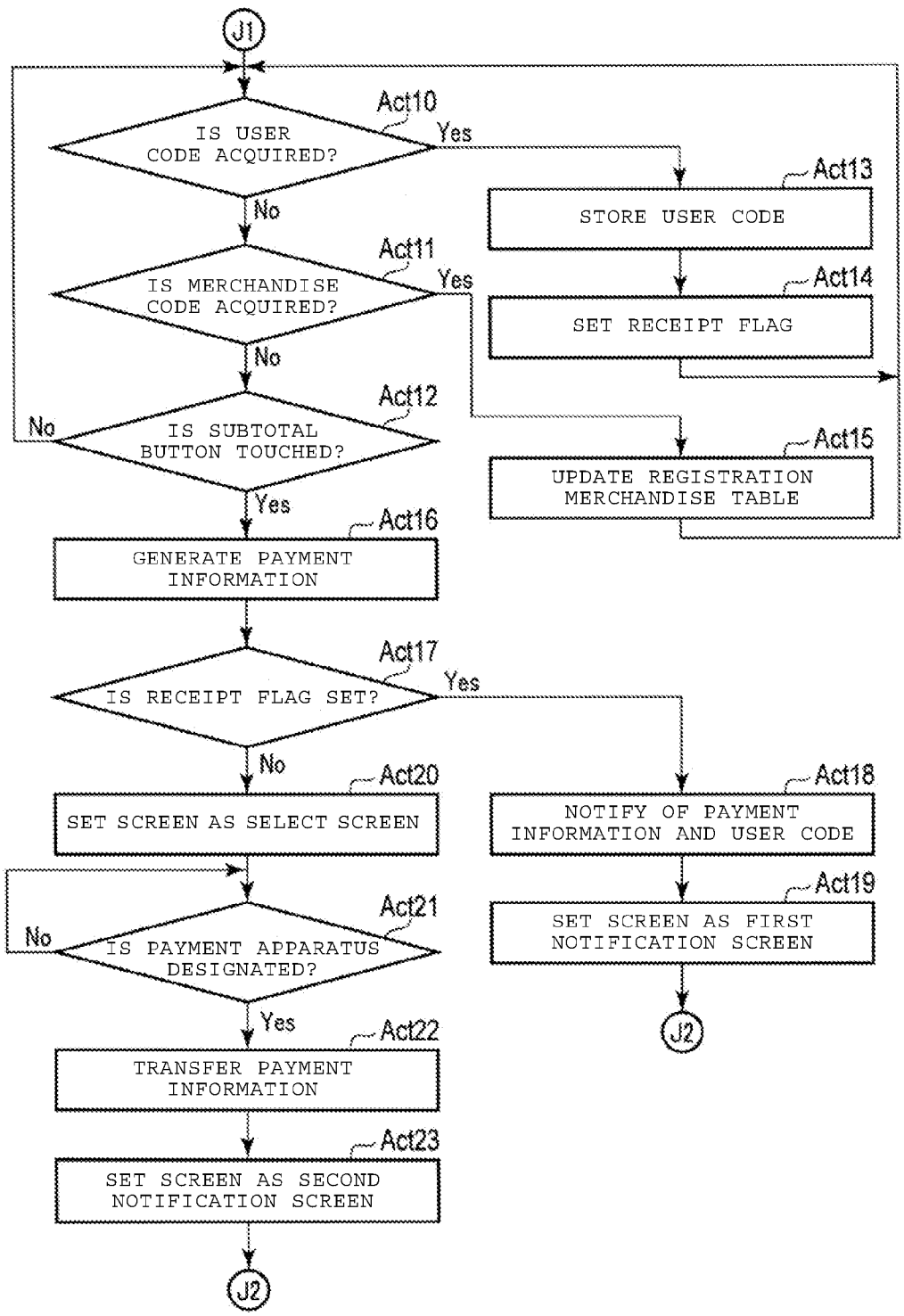

FIGS. 3 and 4 are flow charts of an example sequence of operations of the control process of the CPU 11a.

In Act 1, the CPU 11a resets a receipt flag. The receipt flag indicates a setting of using the electronic receipt service, when the receipt flag is at a set state. The receipt flag is, for example, one bit of data stored in the RAM 11c.

In Act 2, the CPU 11a clears a registration merchandise table that is set in the RAM 11c. The registration merchandise table is a data table that includes information about the merchandise for which registration is completed.

In Act 3, the CPU 11a sets an area of a screen on the second touch panel 11h as a standby screen. The standby screen is intended to indicate that it is possible to start the purchase registration regarding a new transaction, and specific information indicated thereon may be arbitrary.

In Act 4, the CPU 11a checks whether or not a user code for identifying the user of the electronic receipt service is acquired. If NO is determined because the user code is not acquired, the CPU 11a proceeds to Act 5.

In Act 5, the CPU 11a checks whether or not the merchandise code of merchandise to be subject to purchase registration is acquired. If NO is determined because the merchandise code is not acquired, the CPU 11a returns to Act 4.

Thus, in Act 4 and Act 5, the CPU 11a waits for the acquisition of the user code, or the acquisition of the merchandise code. In addition, the CPU 11a may check the occurrence of other events such as execution of other operations, in the standby herein, and proceed to the process according to the occurred event.

In a state in which the purchase registration of the merchandise that the shopper 22 intends to purchase is performed in the merchandise registration apparatus 11, the shopper 22 stands in front of the merchandise registration apparatus 11. If the shopper 22 wants the application of the electronic receipt service with respect to this transaction, the shopper 22 presents a user code corresponding to the shopper 22 to the salesperson 21. Specifically, the shopper 22 presents, for example, a screen of his own smartphone to the salesperson 21, in a state of displaying a membership card screen including a bar code that represents the user code on the smartphone. Then, the salesperson 21 reads, for example, the bar code into the merchandise registration apparatus 11, with the scanner 11f. In this case, the CPU 11a makes a determination of Yes in Act 4, and proceeds to Act 6.

In addition, a separate scanner may be provided for the shopper 22, and the shopper 22 may operate the scanner to read the membership card screen.

In Act 6, the CPU 11a stores the user code represented by the bar code that is read by the scanner 11f, into the RAM 11c or the auxiliary storage unit 11d. Thus, since the CPU 11a executes the control process based on the control program, the computer having the CPU 11a functions as a first acquisition unit.

In Act 7, the CPU 11a sets the receipt flag. Thereafter, the CPU 11a returns to the standby state of Act 4 and Act 5.

Incidentally, the CPU 11a acquires the merchandise code, according to the operation by the salesperson 21, through processing other than the control process illustrated in FIGS. 3 and 4. If Yes is determined in Act 5 because the merchandise code is acquired in the standby state of Act 4 and Act 5 illustrated in FIG. 3, the CPU 11a proceeds to Act 8.

In Act 8, the CPU 11a updates the registration merchandise table in order to include the acquired merchandise code.

In Act 9, the CPU 11a sets a region of the screen of one or more of the first touch panel 11g and the second touch panel 11h as a registration screen. The registration screen displays the contents of the registration merchandise table and is intended to allow the shopper 22 to check the status of the registration. The CPU 11a changes the registration screen depending on a state of the receipt flag.

FIG. 5 illustrates an example registration screen SC1 before acquisition of a user code. FIG. 6 illustrates a registration screen SC2 after the acquisition of the user code.

Before the user code is acquired, in other words, in a state where the receipt flag is not set, the CPU 11a creates a screen such as the registration screen SC1. In addition, after the user code is acquired, in other words, in a state where the receipt flag is set, the CPU 11a creates a screen such as the registration screen SC2.

Both registration screens SC1 and SC2 include regions R1 and R2. The registration screen SC2 further includes an icon IC1.

The region R1 represents the merchandise name, the number, and the unit price of the merchandise for which purchase registration is most recently made, as well as the total number and the total money of all of the registered merchandise. The region R2 represents the list of merchandise names, the numbers, the unit prices, and the amounts of money of the merchandise for which purchase registration is previously made compared to the merchandise displayed on the registration screen SC1. The Icon IC1 represents a setting in which the electronic receipt service is used.

Incidentally, the registration screens SC1 and SC2 display various types of information about a plurality of merchandise for which purchase registration is made, in order to clarify the roles of the regions R1 and R2. However, when the CPU 11a proceeds to Act 9, the registration merchandise table includes only information related to one of the merchandise. Therefore, on the registration screen, the information about the merchandise is represented in the region R1, and the information about the merchandise is not represented in the region R2.

The CPU 11a causes various functional buttons such as a merchandise button by which the salesperson 21 designates merchandise and a subtotal button to be displayed in a region other than the regions R1 and R2, on the screen of the first touch panel 11g.

In Act 10 of FIG. 4, the CPU 11a checks whether or not the user code is acquired. If NO is determined because the user code is not acquired, the CPU 11a proceeds to Act 11.

In Act 11, the CPU 11a checks whether or not the merchandise code of merchandise to be subject to purchase registration is acquired. If NO is determined because the merchandise code is not acquired, the CPU 11a proceeds to Act 12.

In Act 12, the CPU 11a checks whether or not the subtotal button that is displayed on the screen of the first touch panel 11g is touched. If NO is determined because the operation is not performed, the CPU 11a returns to Act 10.

Thus, in Act 10 to Act 12, the CPU 11a waits for the acquisition of the user code, the acquisition of a new merchandise code, or the touch of the subtotal button. In addition, the CPU 11a may check the occurrence of other events such as execution of other operations and proceed to the process according to the occurred event.

While the purchase registration is made, the shopper 22, who waits for the completion of the purchase registration by the salesperson 21, may present a screen of his own smartphone to the salesperson 21, in a state of displaying a membership card screen including a bar code representing the user code on the smartphone. The salesperson 21 who views the membership card screen reads, for example, the bar code into the merchandise registration apparatus 11, with the scanner 11f. In this case, the CPU 11a makes a determination of Yes in Act 10, and proceeds to Act 13.

In Act 13, the CPU 11a stores the user code represented by the bar code that is read by the scanner 11f, into the RAM 11c or the auxiliary storage unit 11d.

In Act 14, the CPU 11a sets the receipt flag. Thereafter, the CPU 11a returns to the standby state of Act 10 to Act 12. In response thereto, the CPU 11a updates the registration screen so as to represent an icon IC1.

Meanwhile, if Yes is determined in Act 11 because the merchandise code is acquired similar to the described above, the CPU 11a proceeds to Act 15.

In Act 15, the CPU 11a updates the registration merchandise table so as to include the acquired merchandise code. In response thereto, the CPU 11a updates the registration screen so as to conform to the contents of the updated registration merchandise table. Thereafter, the CPU 11a returns to the standby state of Act 10 to Act 12. The registration merchandise table, generated in this way, represents a list of purchase merchandise.

Then, if the purchase registration of all of purchase merchandise for one transaction is completed, the salesperson 21 touches the subtotal button on the first touch panel 11g. If Yes is determined in Act 12 because the touch of the subtotal button is detected by the first touch panel 11g, the CPU 11a proceeds to Act 16.

In Act 16, the CPU 11a generates payment information for paying for the registered merchandise, based on the contents of the registration merchandise table at this time. The payment information includes a list of registered merchandise. The payment information may also include information such as the total number and total money of the purchase merchandise. Thus, since the CPU 11a executes the control process based on the control program, the computer having the CPU 11a as its central processor functions as a first generation unit.

In Act 17, the CPU 11a checks whether or not the receipt flag is at a set state. If Yes is determined because the receipt flag is at a set state, the CPU 11a proceeds to Act 18.

In Act 18, the CPU 11a transmits the payment information and the user code to the receipt server 13. Specifically, the CPU 11a accesses the receipt server 13, and controls the communication unit 11k so as to transmit the payment information that is generated in Act 16, and the user code that is stored in the RAM 11c or the auxiliary storage unit 11d to the receipt server 13. Thus, since the CPU 11a executes the control process based on the control program, the computer having the CPU 11a as its central processor functions as a first transmission unit.

In Act 19, the CPU 11a sets a region of the screen on the first touch panel 11g as a first notification screen.

The first notification screen is a screen for causing the salesperson 21 to recognize that the payment information is transferred to the receipt server 13 for semi-self-service payment. In addition, the semi-self-service payment is a payment type in which the payment apparatus 12 performs payment in response to the operation by the shopper 22. When the salesperson 21 checks the first notification screen, the salesperson 21 informs the shopper 22 that the shopper is to perform payment with a certain payment apparatus 12. In this case, when the payment is started in the payment apparatus 12, the salesperson 21 may inform a shopper that the shopper needs to pass the above-mentioned membership card screen over the scanner 12f of the payment apparatus 12.

If a button which is displayed on the first notification screen for causing the salesperson 21 to instruct to close the first notification screen is touched, the CPU 11a returns to Act 1 of FIG. 3, and repeats the subsequent processes in the same manner as described above.

Meanwhile, if No is determined in Act 17 because the receipt flag is not at a set state, the CPU 11a proceeds to Act 20.

In Act 20, the CPU 11a sets a region of a screen on the first touch panel 11g as a selection screen. The selection screen is a GUI screen for causing the operator to designate the payment apparatus 12 which is the destination of the payment information, and includes a plurality of buttons to which different payment apparatuses 12 are respectively allocated.

In Act 21, the CPU 11a checks whether or not the payment apparatus 12 which is the destination of the payment information is designated. If No is determined because the payment apparatus 12 is not designated, the CPU 11a repeats Act 21. Thus, in Act 21, the CPU 11a waits for the designation of the payment apparatus 12 which is the destination of the payment information.

At the time of the standby state of Act 21, if the payment apparatus 12 is designated by, for example, any button on the selection screen being touched by the salesperson 21, the CPU 11a makes a determination of Yes in Act 21, and proceeds to Act 22.

In Act 22, the CPU 11a transmits the payment information, to the designated payment apparatus 12. Specifically, the CPU 11a controls the communication unit 11k so as to transmit the payment information over the LAN 14, with the designated payment apparatus 12 as the destination. In this manner, the CPU 11a selects one of the payment apparatuses 12 based on the operation by the operator, and also transmits the payment information to the selected payment apparatus. Thus, since the CPU 11a executes the control process based on the control program, the computer having the CPU 11a as its central processor functions as a selection unit. Thus, since the CPU 11a executes the control process based on the control program, the function as a fourth transmission unit is implemented by the cooperation of the computer having the CPU 11a as its central processor and the communication unit 11k.

In Act 23, the CPU 11a sets a region of the screen on the first touch panel 11g as a second notification screen.

The second notification screen is a screen for causing the salesperson 21 to recognize that the payment information for semi-self-service payment is transmitted to the designated payment apparatus 12. When the second notification screen is checked, the salesperson 21 informs the shopper 22 that the shopper is to perform payment in the designated payment apparatus 12.

If a button represented on the second notification screen is touched in order for the salesperson 21 to instruct to close the second notification screen, the CPU 11a returns to Act 1 of FIG. 3, and repeats the subsequent processes in the same manner as described above.

Incidentally, when the receipt server 13 is at a normal operation state, the CPU 13a starts the control process according to the control program stored in the ROM 13b or the auxiliary storage unit 13d.

Figure 7:
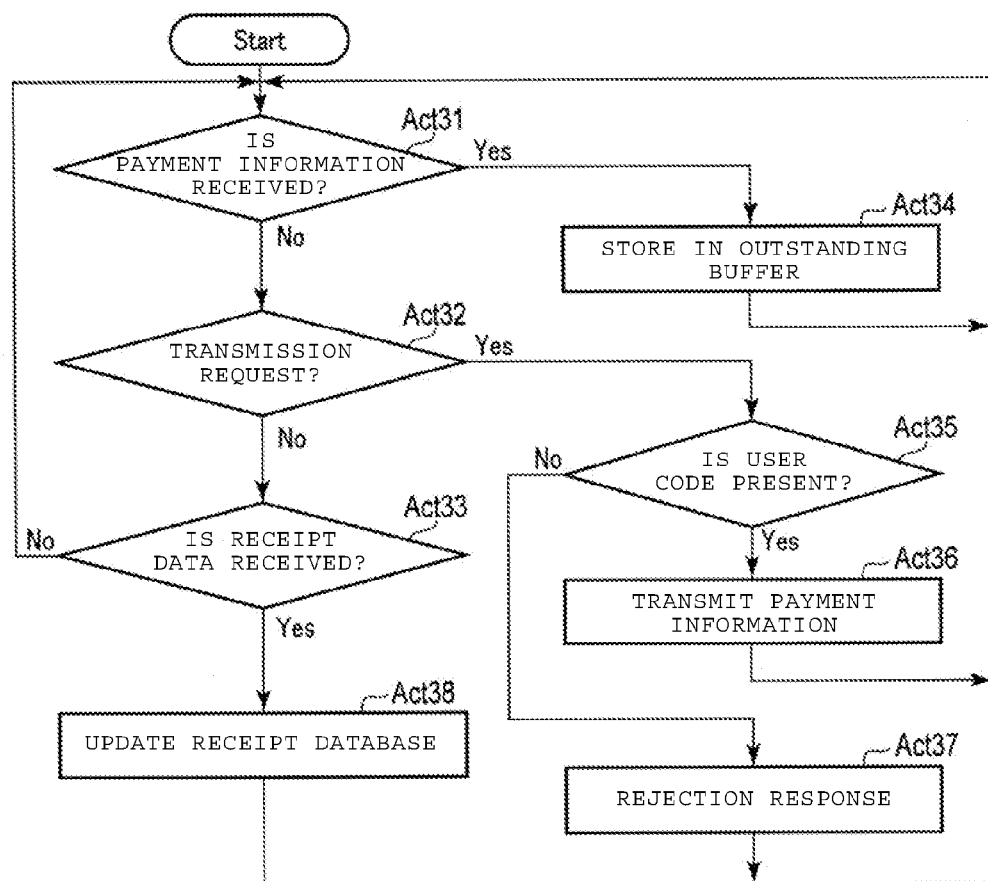
FIG. 7 is a flow chart of an example sequence of operations of a control process of a CPU included in a receipt server.

FIG. 7 is a flow chart of a control process of the CPU 13a.

In Act 31, the CPU 13a checks whether or not the payment information is received from the merchandise registration apparatus 11. If No is determined because the payment information is not received, the CPU 13a proceeds to Act 32.

In Act 32, the CPU 13a checks whether or not there is a transmission request from the payment apparatus 12. If No is determined because there is no transmission request, the CPU 13a proceeds to Act 33.

In Act 33, the CPU 13a checks whether or not the electronic receipt data transmitted from the payment apparatus 12 is received. If No is determined because the electronic receipt data is not received, the CPU 13a returns to Act 31.

In Act 31 to Act 33, the CPU 13a waits for the transmission of the payment information, the presence of the transmission request, or the reception of the electronic receipt data.

If the payment information and the user code are transmitted by the CPU 11a executing Act 18 of FIG. 4, the payment information and the user code are received by the CPU 13a through the communication unit 13e. Thus, the CPU 13a makes a determination of Yes in Act 31, and proceeds to Act 34.

In Act 34, the CPU 13a stores the payment information in association with the user code in a buffer. The buffer is intended to store the payment information and the user code of a transaction for which the payment process by the payment apparatus 12 is on standby. The buffer is defined in some of the storage area of the RAM 13c or the auxiliary storage unit 13d. If the storage of the payment information and the user code is completed, the CPU 13a returns to the standby state of Act 31 to Act 33. Thus, the RAM 13c or the auxiliary storage unit 13d is an example of the storage device that stores the payment information in association with the user code. Since the CPU 13a executes the control process based on the control program, the computer having the CPU 13a as its central processor functions as a storage control unit.

Meanwhile, if the payment apparatus 12 is activated, the CPU 12a starts the control process according to the control program that is stored in the ROM 12b or the auxiliary storage unit 12d.

Figure 8:
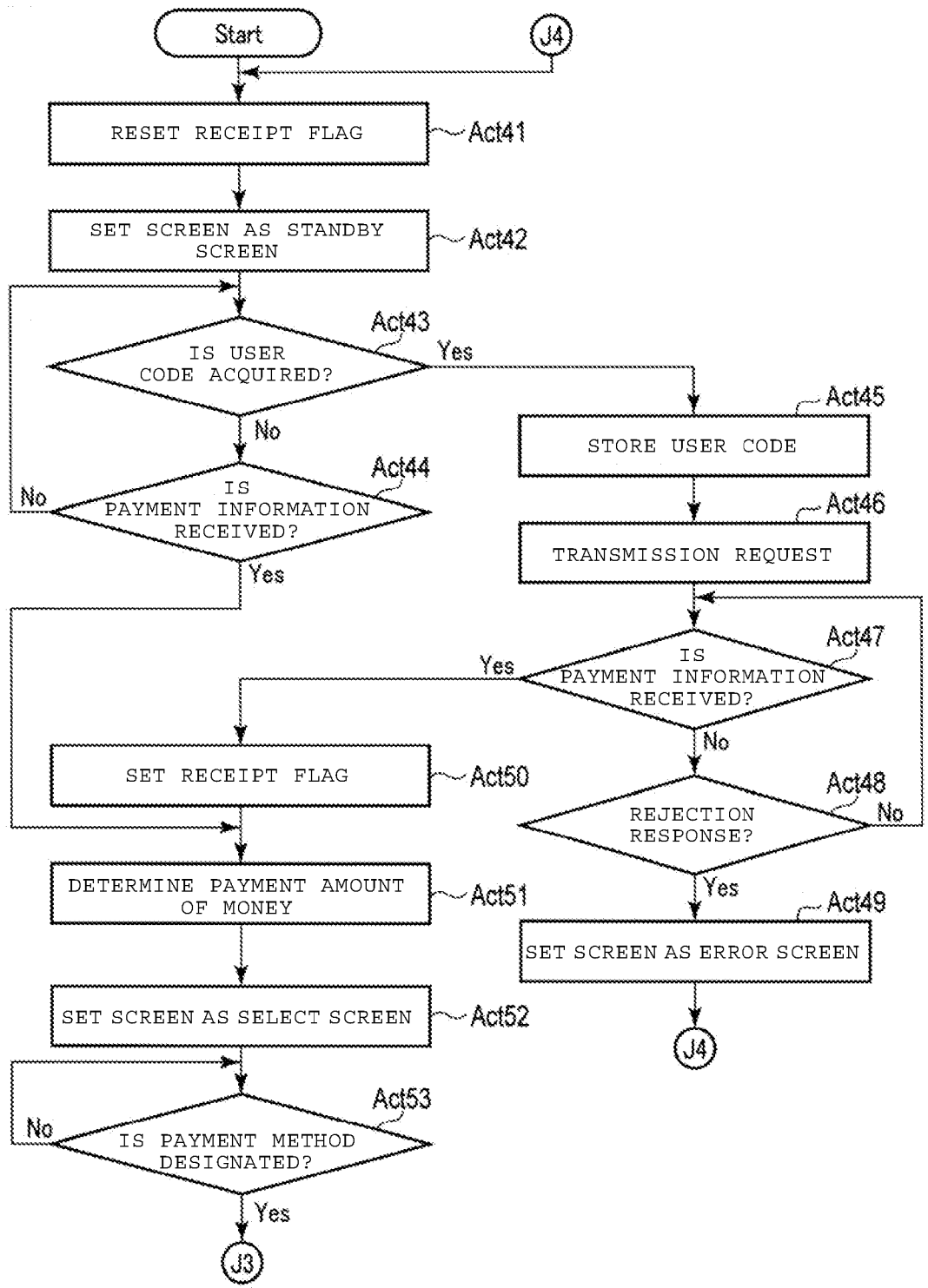
FIGS. 8 and 9 are flow charts of an example sequence of operations of a control process of a CPU included in a payment apparatus
Figure 9:
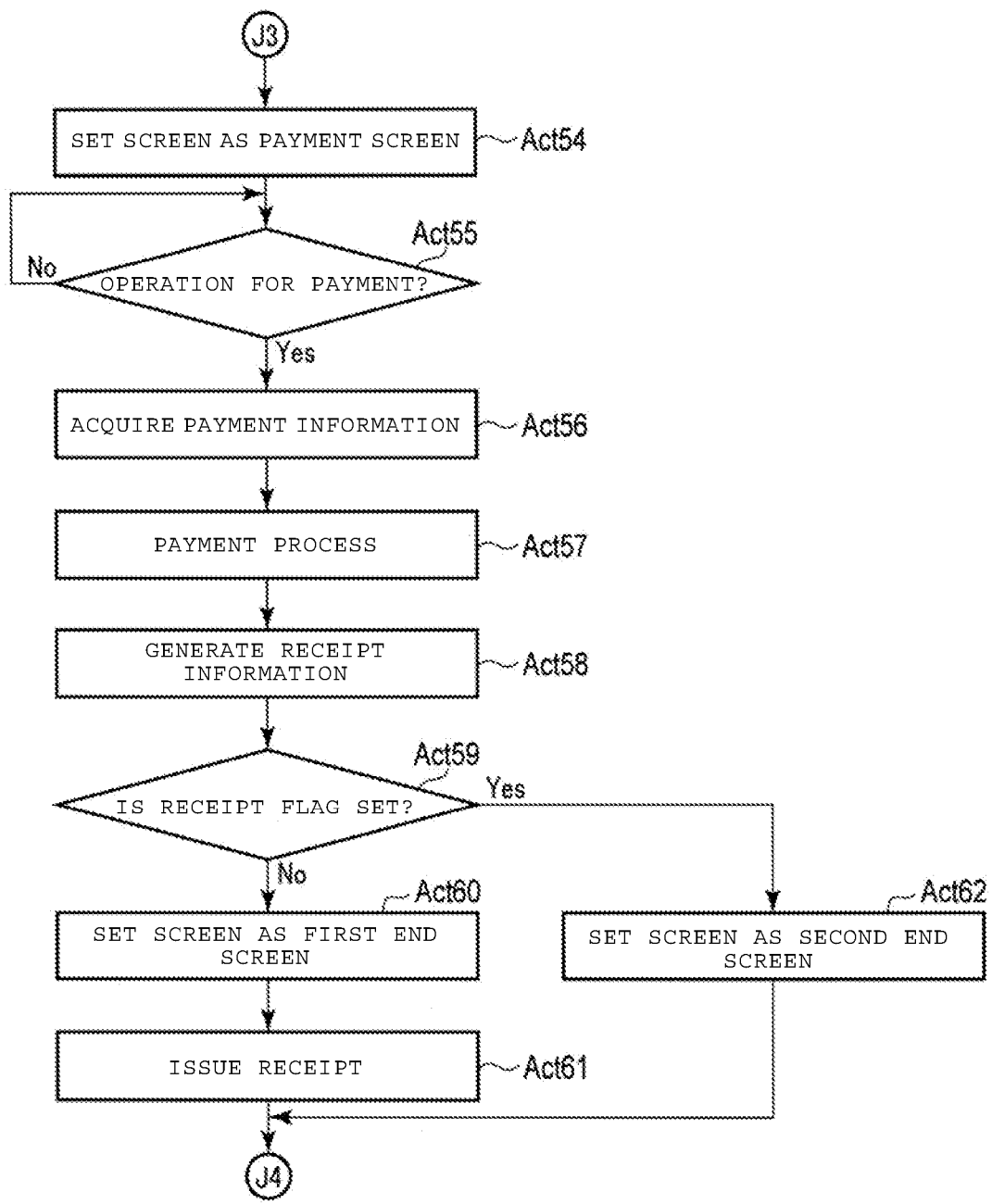

FIG. 8 and FIG. 9 are flow charts of an example sequence of operations for the control process of the CPU 12a.

In Act 41 of FIG. 8, the CPU 12a resets the receipt flag. The receipt flag indicates a setting of using the electronic receipt service, when the receipt flag is at a set state. The receipt flag is, for example, one bit of data stored in the RAM 12c.

In Act 42, the CPU 12a sets the screen on the touch panel 12g as a standby screen. The standby screen represents a situation where the payment is not performed, and the information represented on the standby screen may be arbitrary. For example, it is assumed that the standby screen displays an image representing a text message representing that it is unable to perform the payment as a basic screen, or displays any image representing advertisement or the like as a screen saver.

In Act 43, the CPU 12a checks whether or not the user code is acquired. If No is determined because the user code is not acquired, the CPU 11a proceeds to Act 44.

In Act 44, the CPU 12a checks whether or not the payment information is received. If No is determined because the payment information is not received, the CPU 12a returns Act 43.

Thus, in Act 43 and Act 44, the CPU 12a waits for the acquisition of the user code or the reception of the payment information. In addition, the CPU 11a may check for occurrence of other events such as execution of other operations and proceed to the processes according to the occurred events.

The shopper 22, who presents a membership card screen at the time of merchandise registration and is informed to perform payment with a certain payment apparatus, selects a single payment apparatus among the payment apparatuses 12 of which the screens of the touch panels 12g are standby images, and passes the membership card screen over the scanner 12f included in the payment apparatus 12. Thus, the scanner 12f reads the bar code displayed on the membership card screen. The scanner 12f transmits the user code represented by the read bar code to the CPU 12a. If the user code is acquired in this manner, the CPU 12a makes a determination of Yes in Act 43, and proceeds to Act 45. Thus, since the CPU 12a executes the control process based on the control program, the function as a second acquisition unit is implemented by the cooperation of the computer having the CPU 12a as its central processor and the scanner 12f.

In Act 45, the CPU 12a stores the user code in the RAM 12c or the auxiliary storage unit 12d.

In Act 46, the CPU 12a makes a transmission request to the receipt server 13. Specifically, after a session with the receipt server 13 is established, the CPU 12a controls the communication unit 12j so as to transmit a predetermined command indicating the transmission request and the acquired user code on the session. Thus, since the CPU 12a executes the control process based on the control program, the computer having the CPU 12a as its central processor implements the function as a request unit in cooperation with the communication unit 12j.

If the command and the user code are transmitted to the receipt server 13 through the network 15, the communication unit 13e receives the command and the user code, and stores them in the RAM 13c or the auxiliary storage unit 13d. The CPU 13a makes a determination of Yes in Act 32 of FIG. 7, in response to such a reception operation, and proceeds to Act 35.

In Act 35, the CPU 13a checks whether or not the received user code is stored in the buffer. If the user code is stored in the buffer, the CPU 13a makes a determination of Yes, and proceeds to Act 36.

In Act 36, the CPU 13a transmits the payment information stored in the buffer in association with the received user code, to the payment apparatus 12 that sent the transmission request. Specifically, the CPU 13a controls the communication unit 13e so as to transmit the payment information to the payment apparatus 12 that requested the transmission. Thus, since the CPU 13a executes the control process based on the control program, the computer having the CPU 13a as its central processor implements the function as the second transmission unit in cooperation with the communication unit 13e.

In contrast, if No is determined in Act 35 because the received user code is not stored in the buffer, the CPU 13a proceeds to Act 37.

In Act 37, the CPU 13a performs a rejection response. Specifically, the CPU 13a controls the communication unit 13e so as to transmit to the payment apparatus 12 that requested the transmission a predetermined command indicating that it is not possible to process the transmission request.

If Act 36 or Act 37 is completed, the CPU 13a returns to the standby state of Act 31 to Act 33.

After making the transmission request in Act 46 of FIG. 8, the CPU 12a proceeds to Act 47.

In Act 47, the CPU 12a checks whether or not the payment information transmitted from the receipt server 13 is received. If No is determined because the payment information is not received, the CPU 12a proceeds to Act 48.

In Act 48, the CPU 12a checks whether or not a rejection response is made. If No is determined because the rejection response is not made, the CPU 12a returns to Act 47.

Thus, in Act 47 and Act 48, the CPU 12a waits for the transmission of the payment information or the rejection response to the transmission request.

If Yes is determined because the rejection response is made as described above, the CPU 12a proceeds to Act 49.

In Act 49, the CPU 12a displays an error screen on the touch panel 12g. The error screen is a screen informing the shopper 22 that there is no payment information associated with the user code represented on the membership card screen that the shopper 22 uses; in other words, no payment information corresponding to the user code is received. The CPU 12a returns from Act 49 to Act 41, for example, in after displaying the error screen for a predetermined time, and repeats the subsequent processes in a manner similar to that described above.

If the payment information that the receipt server 13 transmits as described above is transmitted to the payment apparatus 12 through the LAN 14, the communication unit 12j receives the payment information, and stores it in the RAM 12c or the auxiliary storage unit 12d. The CPU 12a makes a determination of Yes in Act 47 in response to the reception operation, and proceeds to Act 50.

In Act 50, the CPU 12a sets the receipt flag. Thereafter, the CPU 12a proceeds to Act 51.

However, if the payment information, which is transmitted to the payment apparatus 12 from the merchandise registration apparatus 11, is also transmitted to the payment apparatus 12 through the LAN 14, the communication unit 12j receives the payment information, and stores it in the RAM 12c or the auxiliary storage unit 12d. The CPU 12a makes a determination of Yes in Act 44 in response to the reception operation, and proceeds to Act 51.

In Act 51, the CPU 12a determines payment amount, based on the payment information. Specifically, the CPU 12a calculates, for example, the total money of the respective amounts of money for the merchandise indicated on the merchandise list included in the payment information, and determines the total money as the payment amount. Alternatively, if the total money is already included in the payment information, no calculation is necessary. Here, if the CPU 12a calculates the total money, the payment apparatus 12 is also referred to as an accounting apparatus.

In Act 52, the CPU 12a sets the screen on the touch panel 12g as a select screen. The select screen is a GUI screen for causing the operator to designate a payment method.

Figure 10:
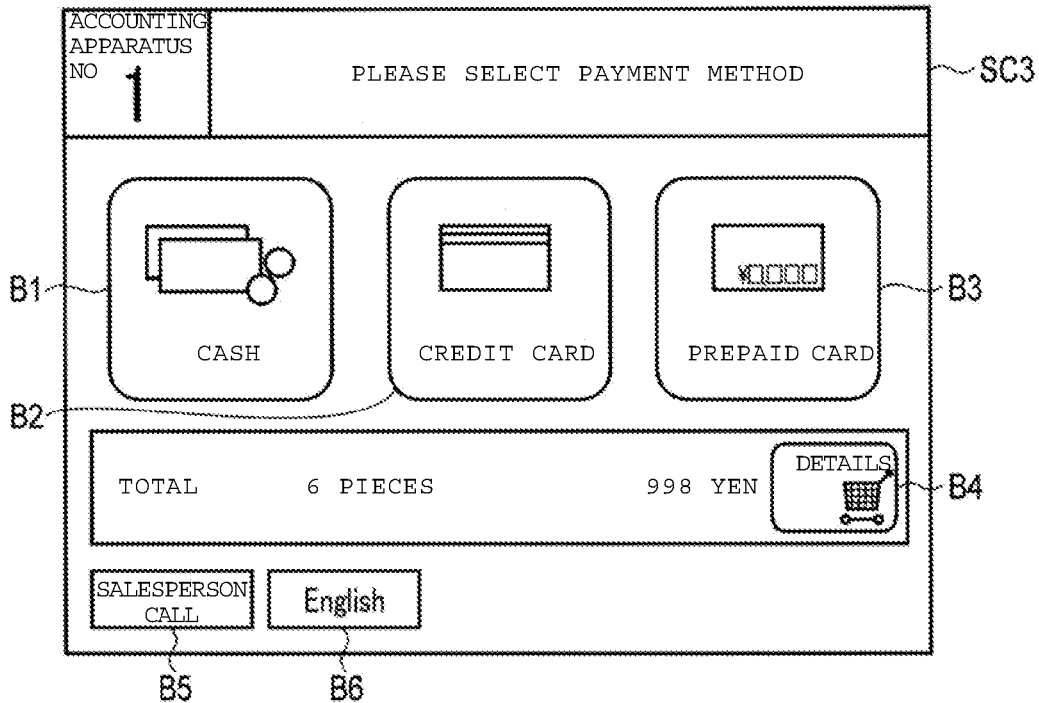
FIG. 10 illustrates an example payment selection screen.

FIG. 10 is a diagram illustrating a select screen SC3 as an example.

The select screen SC3 includes six buttons B1, B2, B3, B4, B5, and B6 which are intended to be touched by the operator for various types of designation. Cash payment, credit payment, and prepaid card payment are allocated respectively to the buttons B1 to B3. Salesperson call and language switching are allocated respectively to the buttons B5 and B6.

In Act 53, the CPU 12a checks whether or not a payment method is designated. If No is determined because the operation of designating a payment method is not performed, the CPU 12a repeats Act 53. Thus, in Act 53, the CPU 12a waits for the designation of the payment method. Incidentally, although not illustrated, the CPU 12a also waits for the execution of other operations. If such an operation is performed, the CPU 12a proceeds to a process, not illustrated, corresponding to the performed operation. For example, if the touch of the button B5 is detected by the touch panel 12g, the CPU 12a proceeds to a process for causing an alarm operation in a monitoring terminal, not illustrated in FIGS. 1 and 2. Further, for example, if the touch of the button B6 is detected by the touch panel 12g, the CPU 12a proceeds to a process for displaying the text in English notation on the screen of the touch panel 12g.

When the screen of the touch panel 12g is a selection screen, the operator designates a payment method, for example, by touching a button to which the payment method to be used in the payment is assigned, among the buttons B1 to B3. If such an operation is detected on the touch panel 12g, the CPU 12a makes a determination of Yes in Act 53, and proceeds to Act 54 of FIG. 9.

In Act 54, the CPU 12a displays a payment screen on the touch panel 12g. The payment screen is a screen for informing the operator of an operation for the input of payment information for performing payment. For example, if cash payment is designated as the payment method, the CPU 12a causes the payment screen to have the contents to encourage the insertion of cash.

In Act 55, the CPU 12a checks whether or not the operation for payment is performed. If No is determined because the operation for payment is not performed, the CPU 12*a* repeats Act 55. Thus, in Act 55, the CPU 12*a* waits for the execution of the operation for payment. Incidentally, although not illustrated, the CPU 12*a* also waits for the execution of other operations. If such an operation is performed, the CPU 12*a* proceeds to a process (not illustrated) corresponding to the performed operation.

The operator performs an operation for payment, according to the payment screen. For example, if cash payment is designated, the operator inserts bills and coins to a bill slot and a coin slot of the automatic change machine 12*e*. In addition, if credit payment or pre-paid card payment is designated, the operator inserts a credit card or a prepaid card to an insertion port of the card reader and writer 12*i*. If one or both of bills and coins are inserted, the automatic change machine 12*e* counts the inserted bills and coins so as to obtain the inserted amount of money. Further, if the credit card is inserted, the card reader and writer 12*i* reads the data recorded in the credit card. If a prepaid card is inserted, the card reader and writer 12*i* reads the data of the balance recorded in the prepaid card.

If Yes is determined in Act 55 because the payment operation is performed, the CPU 12*a* proceeds to Act 56.

In Act 56, the CPU 12*a* acquires the input amount of money obtained by the automatic change machine 12*e* or the data read by the card reader and writer 12*i* as described above, as payment information.

In Act 57, the CPU 12*a* executes the payment using the payment information. If the CPU 12*a* proceeds to Act 57 because Yes is determined in Act 47 of FIG. 8, the CPU 12*a* executes payment based on the payment information which is received from the receipt server 13. Accordingly, since the CPU 12*a* executes the control process based on the control program, the computer having the CPU 12*a* as its central processor functions as the first payment unit. If the CPU 12*a* proceeds to Act 57 because Yes is determined in Act 44 of FIG. 8, the CPU 12*a* executes payment based on the payment information which is received from the merchandise registration apparatus 11. Accordingly, since the CPU 12*a* executes the control process based on the control program, the computer having the CPU 12*a* as its central processor functions as the second payment unit.

In Act 58, the CPU 12*a* generates electronic receipt data, and stores the generated electronic receipt data in the RAM 12*c* or the auxiliary storage unit 12*d*. The electronic receipt data may have, for example, an unstructured format such as a text data format. The CPU 12*a* includes information from the payment information to be described on the receipt such as a merchandise list, and information indicating the result of the payment process, in the electronic receipt data. In addition, the information indicating the result of the payment includes, for example, information such as the amount of money to be paid, a deposit amount, a change amount, or a payment date and time, if cash payment is performed. The information included in the electronic receipt data is optional. However, if the user code is stored in the RAM 12*c* or the auxiliary storage unit 12*d*, the CPU 12*a* includes the user code in the electronic receipt data such that the user code can be identified. Thus, since the CPU 12*a* executes the control process based on the control program, the computer having the CPU 12*a* as its central processor functions as the second generation unit.

In Act 59, the CPU 12*a* checks whether or not the receipt flag is set. If No is determined because the receipt flag is not set, the CPU 12*a* proceeds to Act 60.

In Act 60, the CPU 12*a* sets the screen on the touch panel 12*g* as a first end screen. The first end screen is a screen for notifying the operator that a receipt using a receipt sheet is issued.

Figure 11:
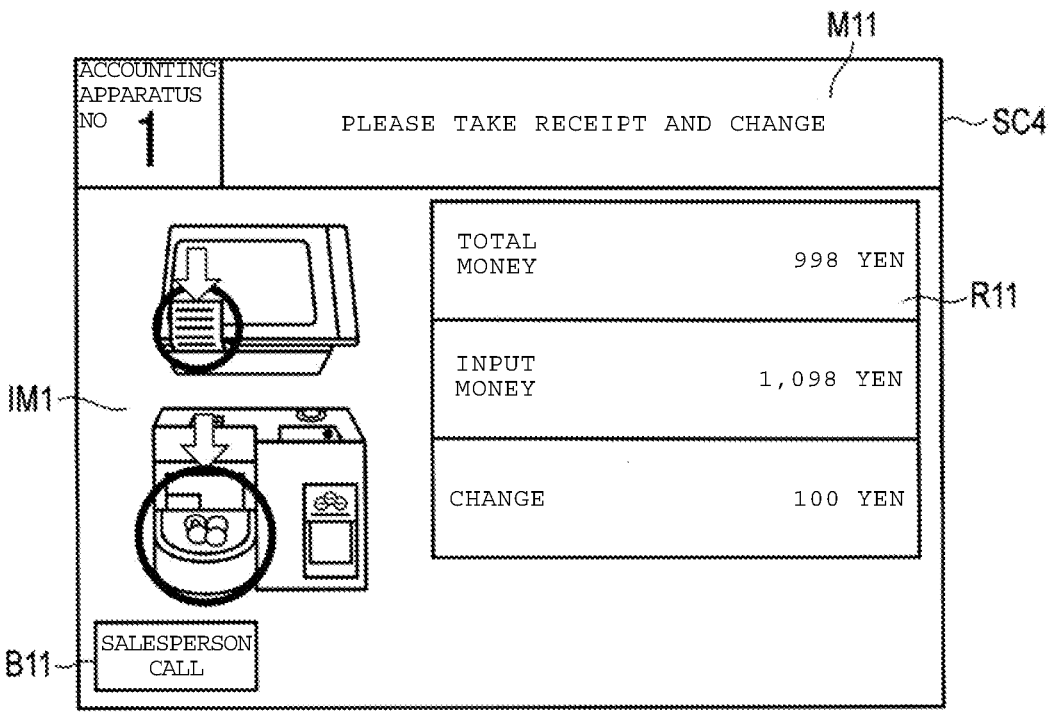
FIG. 11 illustrates an example first end screen.

FIG. 11 is a diagram illustrating a first end screen SC4 as an example.

The first end screen SC4 includes a text message M11, an image IM1, a region R11, and a button B11. The image IM1 represents the state in which the receipt using the receipt sheet is issued. Various amounts of money indicated in the region R11 are changed for each transaction. The first end screen SC4 represents an example of a case where change is dispensed, in addition to the issuance of a receipt. The CPU 12*a* displays the first end screen, if change is not dispensed, by replacing the text message M11 and the image IM1 with another text message and image consistent with change not being dispensed.

In Act 61, the CPU 12*a* operates the printer 12*h* so as to issue a receipt on which the contents of a business transaction of this time are printed on the receipt sheet according to the electronic receipt data generated in Act 58.

Thereafter, the CPU 12*a* returns from Act 61 to Act 41 in FIG. 8, for example, after a predetermined time, and repeats the subsequent processes in a manner similar to that described above.

Meanwhile, if Yes is determined in Act 59 because the receipt flag is set, the CPU 12*a* proceeds to Act 62.

In Act 62, the CPU 12*a* displays a second end screen on the touch panel 12*g*. The second end screen is a screen for notifying the operator that a receipt has not been issued.

Figure 12:
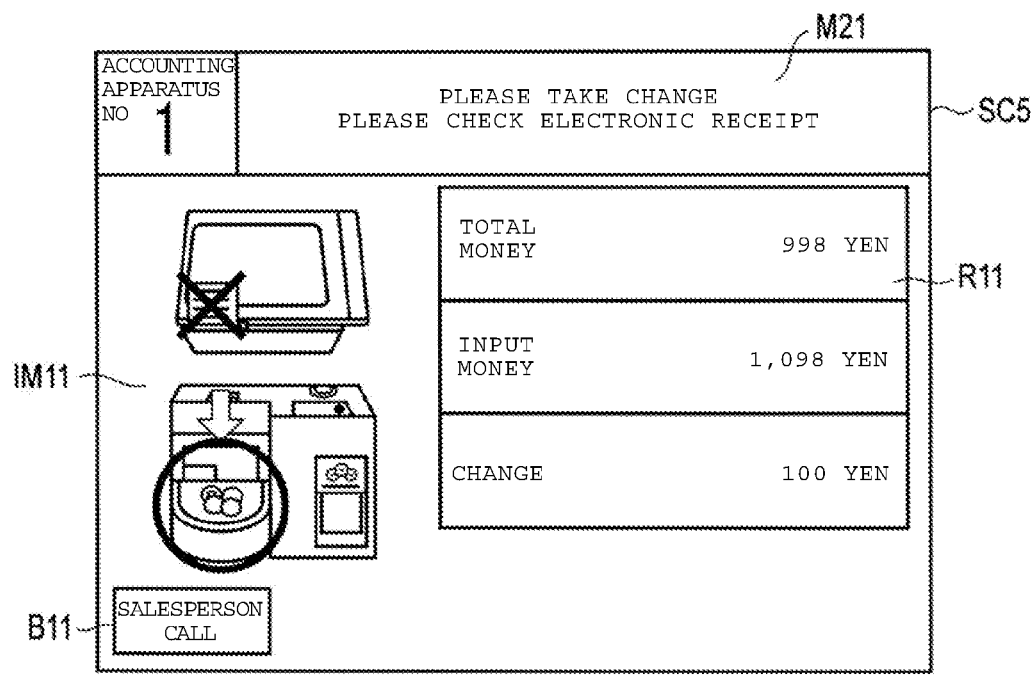
FIG. 12 illustrates an example second end screen.

FIG. 12 is a diagram illustrating a second end screen SC5 as an example. In addition, in FIG. 12, since the same reference numerals are given to the same elements as those in FIG. 10, a detailed description thereof will be omitted.

The second end screen SC5 includes a text message M21, an image IM11, a region R11, and a button B11. The image IM11 represents the state in which the receipt using the receipt sheet is not issued. The second end screen SC5 is an example of a case where a change is dispensed. The CPU 12*a* displays the second end screen, when change is not dispensed, by replacing the text message M21 and the image IM11 with another text message and image consistent with change not being dispensed. The CPU 12*a* returns from Act 62 to Act 41 in FIG. 8, for example, after a predetermined time, and repeats the subsequent processes in a manner similar to that described above.

Figure 13:
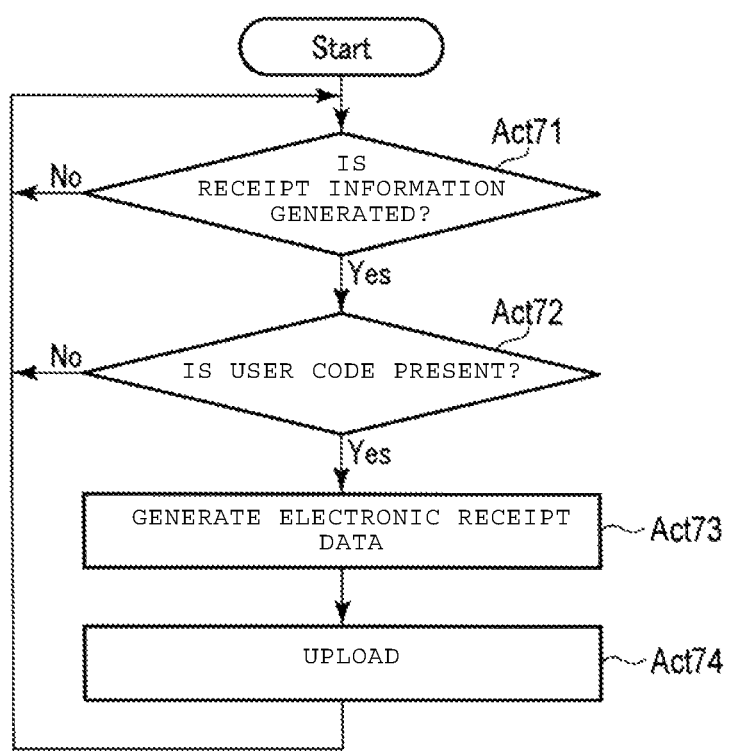
FIG. 13 is a flow chart of another example sequence of operations of the control process of the CPU included in the payment apparatus.

Incidentally, the CPU 12*a* executes the control process illustrated in FIG. 13, in parallel with the control process illustrated in FIG. 8 and FIG. 9 as described above. The control process illustrated in FIG. 13 is a process for implementing the function as a so-called electronic receipt management unit.

In Act 71, the CPU 12*a* checks whether or not the electronic receipt data is generated in Act 58 of FIG. 9. If the electronic receipt data is not generated, the CPU 12*a* repeats Act 71. Thus, in Act 71, the CPU 12*a* waits for the generation of the electronic receipt data. If Yes is determined because the electronic receipt data is generated, the CPU 12*a* proceeds to Act 72.

In Act 72, the CPU 12*a* checks whether or not the user code is included in the generated electronic receipt data. If No is determined because the user code is not included, the CPU 12*a* returns to the standby state of Act 71. In other words, in Act 71, the CPU 12*a* waits for the generation of the electronic receipt data including the user code. If Yes is determined in Act 72 because the electronic receipt data including the user code is generated, the CPU 12*a* proceeds to Act 73.

In Act 73, the CPU 12*a* generates electronic receipt data, based on the electronic receipt data that is generated in Act 58 and stored in the RAM 12*c* or the auxiliary storage unit 12*d*. Specifically, the CPU 12*a* represents the information that is included in the electronic receipt data, for example, in a structured format such as an extensible markup language (XML) format or a comma-separated values (CSV) format, and generates electronic receipt data by adding another type of information as necessary. The format of data in which the electronic receipt data is generated depends on the specification of the electronic receipt service. Here, the CPU 12*a* includes the user code in the electronic receipt data. The CPU 12*a* stores the generated electronic receipt data in the RAM 12*c* or the auxiliary storage unit 12*d*.

In Act 74, the CPU 12*a* uploads the electronic receipt data that is generated as described above to the receipt server 13. Specifically, the CPU 12*a* causes the communication unit 12*j* to perform a process of transferring the electronic receipt data stored in the RAM 12*c* or the auxiliary storage unit 12*d*, to the receipt server 13, by using a predetermined communication protocol. Thus, the communication unit 12*j* is an example of a communication device. Further, since the CPU 12*a* executes the control process based on the control program, the computer having the CPU 12*a* as its central processor functions as a transmission control unit. The function as the third transmission unit is implemented by the cooperation of the computer having the CPU 12*a* as its central processor and the communication unit 12*j*.

After uploading of the electronic receipt data is completed, the CPU 12*a* returns to the standby state of Act 71, and prepares for the generation of next electronic receipt data.

If the electronic receipt data is transmitted to the receipt server 13 through the network 15, the communication unit 13*e* receives the electronic receipt data, and stores it in the RAM 13*c* or the auxiliary storage unit 13*d*. The CPU 13*a* makes a determination of Yes in Act 33 of FIG. 7 in response to the reception operation, and proceeds to Act 38.

In Act 38, the CPU 13*a* updates the receipt database. The receipt database is stored in, for example, the auxiliary storage unit 13*d*. A plurality of different electronic receipt data can be stored in the receipt database in association with the corresponding user code. Specifically, the CPU 13*a* updates the receipt database so as to include the electronic receipt data which is received above. Here, the electronic receipt data includes the user code. Accordingly, the CPU 13*a* manages the electronic receipt data in association with the user code, by using the receipt database. Thus, since the CPU 13*a* executes the control process based on the control program, the computer having the CPU 13*a* as its central processor functions as a management unit. If the update of the receipt database is completed, the CPU 13*a* returns to the standby state of Act 31 to Act 33.

Thus, according to the check-out system 10, the shopper 22 using an electronic receipt service can perform payment using a certain payment apparatus 12 which is in an unoccupied state by passing the membership card screen over the payment apparatus 12, after presenting a membership card screen to the salesperson 21 at the time of merchandise registration. Therefore, the salesperson 21 does not need to select a payment apparatus 12 for the shopper using the electronic receipt service, and the burden on the salesperson 21 who operates the merchandise registration apparatus 11 is reduced.

This embodiment can be modified in many ways as follows.

The user code may also be transmitted to the payment apparatus 12 from the merchandise registration apparatus 11, in a state of being included with the payment information.

The acquisition of the user code in the merchandise registration apparatus 11 and the payment apparatus 12 may be input, for example, in response to the operation in the first touch panel 11*g*, the second touch panel 11*h*, or the touch panel 12*g*.

The electronic receipt data of a non-structured format may also be uploaded from the payment apparatus 12 to the receipt server 13. Then, the receipt server 13 may generate electronic receipt data by performing format conversion to a structured format.

Information indicating the result of the payment is sent from the payment apparatus 12 to the receipt server 13, and the receipt server 13 may generate the electronic receipt data, based on the information and the payment information that is received from the merchandise registration apparatus.

The electronic receipt data without including a user code or the electronic receipt data, and the user code may be separately uploaded from the payment apparatus 12 to the receipt server 13.

The control process for the payment illustrated in FIGS. 8 and 9, and the control process for uploading electronic receipt data illustrated in FIG. 13 may be respectively performed as one control process. In this case, the user code may not be included in the payment information.

The various guide operations may be performed, for example, by a method other than visual display of a text message such as playing of a voice message.

The merchandise is not limited to articles, and may be a service. Thus, the "purchase merchandise" may also refer to a service that is provided at a cost to from a provider to a receiver.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A check-out system for performing a check-out process, comprising:
    a receipt server including a memory that stores payment information associated with a user code;
    a registration apparatus including:
        a first communication unit;
        a first input device configured to receive input of merchandise information for merchandise items to be purchased in a transaction and receive input of a user code in connection with the transaction; and
        a first controller configured to:
            generate payment information based on the input merchandise information;
            when the user code is input in the first input device, control the first communication unit to transmit to the receipt server the generated payment information with the user code; and when the user code is not input in the first input device, control the first communication unit to transmit the generated payment information to one of a plurality of payment apparatuses; and each of the payment apparatuses including:
  a second communication unit;
  a second input device configured to receive input of the user code; and
  a second controller configured to:
    when the user code is input in the second input device, control the second communication unit to transmit to the receipt server a request for the payment information using the user code input in the second input device and receive from the receipt server the payment information associated with the user code, and process payment based on the received payment information; and
    when the user code is not input in the second input device, process payment based on the payment information received from the registration apparatus.

2. The system according to claim 1, wherein
the request for the payment information includes the user code input in the second input device and is transmitted by the second communication unit to the server; and
the server transmits the payment information to the second communication unit in response to the request for the payment information.

3. The system according to claim 2, wherein the server is configured to:
  store a plurality of payment information each associated with a user code;
  determine whether the user code included in the request is associated with one of the plurality of payment information; and
  if the user code included in the request is not associated with any payment information, transmit a rejection response to the second communication unit instead of transmitting the payment information.

4. The system according to claim 1, wherein, if the user code is not input in the first input device, the first communication unit transmits the payment information, without any user code, to the second communication unit included in a selected one of the plurality of payment apparatuses.

5. The system according to claim 4, wherein one of the plurality of payment apparatuses is selected by an operator of the registration apparatus.

6. The system according to claim 1, further comprising:
  a printer, wherein if the user code is not input in the first input device, the printer prints a receipt including details of the transaction after the payment is processed in the payment apparatus.

7. The system according to claim 6, wherein if the user code is input in the first input device, the printer does not print the receipt.

8. The system according to claim 1, wherein the first input device is a scanner.

9. The system according to claim 1, wherein the registration apparatus further includes a storage unit configured to:
  store the input merchandise information, and
  if the user code is input in the first input device in connection with the transaction, store a flag associated with the input merchandise information.

10. The system according to claim 9, wherein the first controller determines a transmission destination of the payment information based on whether the flag is stored in association with the merchandise information.

11. The system according to claim 10, wherein the first controller controls the first communication unit to transmit the payment information to the server if the flag is stored in association with the merchandise information.

12. The system according to claim 11, wherein the first controller controls the first communication unit to transmit the payment information to a selected one of the plurality of payment apparatuses if the flag is not stored in association with the merchandise information.

13. The system according to claim 12, wherein the selected one of the plurality of payment apparatuses is selected by an operator of the registration apparatus.

14. The system according to claim 1, wherein
each of the payment apparatuses includes a display, and
the second controller of each payment apparatus controls the display to display information about the transaction that varies depending on whether the user code is input in the first input device.

* * * * *